United States Patent
Richter et al.

(10) Patent No.: US 11,155,662 B2
(45) Date of Patent: Oct. 26, 2021

(54) IMPROVING THE PROPERTIES IN PMMA FOAMS BY USING METHACRYLIC AMIDES

(71) Applicant: Evonik Operations GmbH, Essen (DE)

(72) Inventors: Thomas Richter, Darmstadt (DE); Christoph Seipel, Babenhausen (DE); Kay Bernhard, Cheshire, CT (US)

(73) Assignee: Evonik Operations GmbH, Essen (DE)

( * ) Notice: Subject to any disclaimer, the term of this patent is extended or adjusted under 35 U.S.C. 154(b) by 124 days.

(21) Appl. No.: 16/331,618

(22) PCT Filed: Aug. 31, 2017

(86) PCT No.: PCT/EP2017/071839
§ 371 (c)(1),
(2) Date: Mar. 8, 2019

(87) PCT Pub. No.: WO2018/046380
PCT Pub. Date: Mar. 15, 2018

(65) Prior Publication Data
US 2019/0211124 A1   Jul. 11, 2019

(30) Foreign Application Priority Data
Sep. 12, 2016   (EP) .................... 16188243

(51) Int. Cl.
| | | |
|---|---|---|
| *C08J 9/02* | (2006.01) | |
| *C08F 220/14* | (2006.01) | |
| *C08J 9/04* | (2006.01) | |
| *C08F 2/02* | (2006.01) | |
| *C08J 3/24* | (2006.01) | |
| *C08J 9/10* | (2006.01) | |

(52) U.S. Cl.
CPC .............. *C08F 220/14* (2013.01); *C08F 2/02* (2013.01); *C08J 3/24* (2013.01); *C08J 9/02* (2013.01); *C08J 9/04* (2013.01); *C08J 9/102* (2013.01); *C08F 2800/20* (2013.01); *C08F 2810/50* (2013.01); *C08J 2201/026* (2013.01); *C08J 2201/032* (2013.01); *C08J 2203/04* (2013.01); *C08J 2205/10* (2013.01); *C08J 2333/12* (2013.01)

(58) Field of Classification Search
CPC ........ C08F 2/02; C08F 220/14; C08F 220/18; C08F 220/56; C08F 2800/20; C08F 2810/20; C08F 2810/50; C08J 9/04; C08J 9/02; C08J 3/24; C08J 9/102; C08J 2205/10; C08J 2201/032; C08J 2203/04; C08J 2201/026; C08J 2333/12; C08L 33/12

See application file for complete search history.

(56) References Cited

U.S. PATENT DOCUMENTS

| | | |
|---|---|---|
| 3,172,868 A | 3/1965 | Jefferson |
| 3,663,462 A | 5/1972 | Arndt et al. |
| 4,816,492 A | 3/1989 | Schiller et al. |
| 8,617,708 B2 | 12/2013 | Murakami |
| 2016/0304680 A1* | 10/2016 | Doi ........................... C09J 7/26 |

FOREIGN PATENT DOCUMENTS

| | | | |
|---|---|---|---|
| CN | 101328243 B | | 5/2011 |
| CN | 103304731 A | * | 9/2013 |
| EP | 0 068 439 B1 | | 2/1987 |
| JP | 48-43054 | | 6/1973 |
| JP | 55-139433 A | | 10/1980 |
| JP | H011319546 | * | 12/1989 |
| JP | 2001-302733 A | | 10/2001 |
| JP | 2002-3635 A | | 1/2002 |
| JP | 2006-45256 A | | 2/2006 |
| JP | 2006-89705 A | | 4/2006 |
| JP | 2010-018647 A | | 1/2010 |
| JP | 2012-201704 A | | 10/2012 |
| JP | 2012-201705 A | | 10/2012 |
| JP | 2013-75935 A | | 4/2013 |
| JP | 2013-227493 A | | 11/2013 |
| RU | 2 486 211 C1 | | 6/2013 |
| TW | I352097 | | 11/2011 |
| WO | WO 2010/149441 A1 | | 12/2010 |
| WO | WO-2010149441 A1 | * | 12/2010 ................ C08J 9/30 |
| WO | WO 2015/071239 A1 | | 5/2015 |

OTHER PUBLICATIONS

International Search Report dated Nov. 22, 2017 in PCT/EP2017/071839 filed Aug. 31, 2017.
Odinei Hess Goncalves, et al., "Foaming of Poly(Methyl Methacrylate) Particles" Materials Science and Engineering C, vol. 29, No. 2, pp. 479-484.

* cited by examiner

*Primary Examiner* — Kara B Boyle
(74) *Attorney, Agent, or Firm* — Oblon, McClelland, Maier & Neustadt, L.L.P.

(57) ABSTRACT

The present invention relates to novel PMMA foams and the production thereof. Here, polymers which have been obtained by copolymerization of methacrylamides such as N-isopropylmethacrylamide and without styrene are foamed. It has surprisingly been possible to establish that a stable, simple-to-produce PMMA foam which has very good properties, e.g. a very high compressive strength, and can be joined more simply to covering layers, especially in comparison with known PMMA foams, can be obtained according to the invention.

20 Claims, No Drawings

IMPROVING THE PROPERTIES IN PMMA FOAMS BY USING METHACRYLIC AMIDES

FIELD OF THE INVENTION

The present invention relates to novel PMMA foams and also the production thereof. Here, polymers which have been obtained by copolymerization of methacrylamides, e.g. N-isopropylmethacrylamide, and without styrene are foamed. It has surprisingly been able to be established that a stable, simple-to-produce PMMA foam having very good properties such as a very high compressive strength can be obtained according to the invention; this can, in particular, be joined more simply, compared to known PMMA foams, to covering layers.

PRIOR ART

Rigid polymer foams are generally known and are employed in a wide variety of fields, e.g. as insulation material, in packaging and also in lightweight construction. The foams should have high strengths coupled with low density when used in lightweight construction in particular. The foams used therein include PVC, PET, specific PU and P(M)I (poly(meth)acrylimide) foams, and they are used inter alia as core material in sandwich composites.

PMMA foams are extensively described in the literature, but have hitherto achieved little if any industrial significance. One reason is the frequently described, but very complicated production via autoclave processes in which PMMA is loaded with gaseous blowing agents, e.g. $CO_2$ or $N_2$, under high pressures in an autoclave and then expanded by release of pressure.

Sekisui has a number of patent applications describing the production of "acrylic foams" (e.g. JP 48043054, JP 2002003635, JP 2006045256, JP 2012201704, JP 2012201705, JP 2013075935). However, these patent applications describe significant amounts of styrene and methacrylamides as comonomers in addition to MMA. The blowing agent used is predominantly urea. However, urea as a blowing agent can lead to problems due to poor solubility in the monomer mixture, which in turn can lead to inhomogeneity in the foam. A further disadvantage with urea as blowing agent is that it acts as a blowing agent by virtue of its decomposition into CO and $NH_3$. This means that the foaming temperature always has to be above the decomposition temperature of urea, greatly curtailing the scope for varying the foaming temperature. Furthermore, $NH_3$ and CO are toxic.

JP 55139433 describes the production of a foam containing between 4 and 35% by weight of acrylic and/or methacrylic acid as comonomer in addition to urea and water as blowing agent. The high proportion of acids leads to a very restricted variety of applications for this foam, which can, for example, only be joined to a very small number of resins, composite materials or adhesives.

U.S. Pat. No. 4,816,492 describes the production of (meth)acrylate-based foams wherein the monomer mixture is polymerized in the presence of blowing agents. The blowing agents used are halogenated hydrocarbons. Halogenated hydrocarbons, however, are problematical in that they have a severely adverse effect on the ozone layer and therefore are subject to significant restrictions. Furthermore, there are restrictions on the degrees of freedom in the foaming operation in that cell size, cell distribution and foam density are adjustable only to a limited extent and not independently of each other. Furthermore, the foams produced exclusively from (meth)acrylates, vinyl acetate and chlorine-containing monomers do not have a good compressive strength.

EP 0 068 439 discloses the production of PMMA-based foams by polymerization of MMA in the presence of a blowing agent and subsequent foaming. It must be emphasized here that a plasticizing agent, in particular a methacrylic ester having three or more carbon atoms in the alkyl group, is used in amounts between 5 and 40 parts by weight, based on MMA, explicitly to obtain foams. The blowing agents are said to be hydrocarbons and/or hydrofluorocarbons. The objective is to produce foams having large cells of, for example, about 5 mm in diameter and thus retain the transparency of the base polymer, in contrast to foams having finer pores. However, the relatively long-chain alkyl radicals have a plasticizing effect on the matrix polymer, which is undesirable for mechanical reasons, especially for rigid foam applications. Furthermore, halogenated hydrocarbons are also described as blowing agents. The teaching of EP 0 068 439 is likewise limited only to very large cells in the foam matrix.

However, it is common to all of these PMMA-based foams that they have a compressive strength which is too low for use in composite materials, in particular sandwich constructions. For uses as core material in sandwich composites, the mechanical properties, especially the compressive strength, are of great importance since they have an influence on the manufacturing processes for the sandwich elements and also on the mechanical properties of the sandwich elements.

Furthermore, these foams often have the disadvantage of being able to be joined to covering layers to only a very restrictive extent by means of adhesive bonding or welding with the matrix material of the covering layer.

OBJECT

It was therefore an object of the present invention to provide a novel process for producing PMMA foams which does not have the above-discussed disadvantages of the prior art.

In particular, it was also an object of the present invention to provide a PMMA formulation which can readily be foamed and at the same time permits wide degrees of freedom in respect of the setting of the pore size, the pore distribution and the foam density. Moreover, the foamed material should have a very high mechanical strength. The foam should, in particular, have a very high compressive strength.

In addition, there was, in particular, the object of providing a suitable PMMA formulation which, as foam, can readily and simply be joined to a second material, e.g. in the form of a covering layer, by means of adhesive bonding, melting or by curing of the resin to the surface. Furthermore, it is important that the PMMA foams obtained are compatible with the resin systems or adhesives used for producing sandwich elements.

A further object of the invention was to optionally provide PMMA foams which have a foaming factor of at least 2 and thus a density in the range from 50 to 350 kg/m³.

Further objects not explicitly mentioned can be derived from the total context of the invention, the claims, the description and the examples.

ACHIEVEMENT OF THE OBJECT

The objects are achieved by a novel process for producing PMMA foams, wherein the production of the foams is carried out by means of a polymerization, for example a plate polymerization of monomer mixtures containing firstly a relevant proportion of MMA, or a syrup of a polymer consisting to a relevant proportion of MMA and a monomer mixture composed to a relevant proportion of MMA, preferably in the presence of a blowing agent which is not gaseous under polymerization conditions and/or a copolymerizable blowing agent. In a second step, the resulting, fully polymerized PMMA plate which has optionally also been subsequently loaded with blowing agent is then foamed by heating.

According to the invention, it was surprisingly found that the use of small amounts of methacrylamide, N-alkylmethacrylamide and/or N,N-dialkylmethacrylamide as comonomers brings about a significant improvement in the mechanical properties of the foams obtained in this way. With regard to later joining to, for example, covering layers to give sandwich components or other composite materials, it has likewise surprisingly been possible to find that the PMMA-based foams of the invention have better further processability in respect of adhesive bonding, welding or surface resin curing compared to the prior art. This results from, in particular, the fact that the present foams comprise (alkyl) methacrylamides but neither styrene nor maleic acid derivatives, compared to the prior art. According to the prior art, however, these three components must necessarily be combined with one another when used. Although styrene-containing PMMA foams have been found to be mechanically very stable, the proportion of styrene led, on the other hand, to incompatibility of the foams with particular resins. Therefore, the foam produced according to the invention is preferably—but not necessarily—free from styrene and maleic acid derivatives.

The process of the invention for producing a polymethacrylate foam is characterized in that a composition containing from 0.2 to 2.0% by weight, preferably from 0.5 to 1.5% by weight, of an initiator, from 0 to 20% by weight, preferably from 0 to 15% by weight, of an unpolymerizable blowing agent, from 0 to 5% by weight, preferably up to 1% by weight, of a chain-transfer agent and from 70 to 99.8% by weight, preferably from 75 to 98.49% by weight, of a monomer mixture is polymerized at a temperature in the range from 20° C. to 100° C. and subsequently foamed at from 130° C. to 250° C.

The composition of the monomer mixture is critical according to the invention. This consists of from 70 to 95% by weight, preferably from 75 to 95% by weight, of MMA, from 0.1 to 5% by weight, preferably from 0.5 to 2.5% by weight, of alkyl acrylates having from 1 to 12 carbon atoms in the alkyl radical, from 0 to 10% by weight, preferably from 0 to 5% by weight, of alkyl methacrylates having from 2 to 12 carbon atoms in the alkyl radical, from 0.5 to 10% by weight, preferably from 1 to 8% by weight, of methacrylamides, N-alkylmethacrylamides and/or N-,N-dialkylmethacrylamides, from 0 to 10% by weight, preferably up to 5% by weight, of crosslinkers, from 0 to 10% by weight, preferably up to 8% by weight, of acrylic, methacrylic and/or itaconic acid and from 0 to 10% by weight of a hydroxy-functional alkyl (meth)acrylate, where the entire monomer mixture or part of the monomer mixture can be present to an extent of up to 80% by weight, preferably up to 50% by weight, as polymer and/or oligomer at the beginning of the polymerization.

The composition can also contain further components. Examples of these further components are, in particular, UV stabilizers, fillers, compatibility improvers, nucleating agents, release agents and pigments.

If oligomers or polymers are to be used, the composition is referred to as a syrup polymerization which has been found to be particularly useful in a casting process between two plates. At the end of such a syrup polymerization, two PMMA types having different compositions can be present side-by-side as a mixture in the foam without this having a relevant influence on foaming. However, other polymerization processes through to solution or suspension polymerization can also be used as alternatives. In the case of the latter, appropriate intermediate filtration or drying steps then have to be carried out. The polymerization, especially in bulk, is preferably carried out at a temperature in the range from 20° C. to 100° C., preferably from 30° C. to 70° C. Foaming is preferably carried out, as a function of the blowing agents used, at a temperature in the range from 130° C. to 250° C., preferably from 150° C. to 230° C.

The polymerization and/or foaming are preferably carried out stepwise at different temperatures. As an alternative or in addition, it is possible for the polymerization and foaming to occur at least partly simultaneously.

The monomer mixture preferably contains N-alkyl(meth) acrylamides having from 1 to 12 carbon atoms in the alkyl group and no methacrylamide or N,N-dialkylmethacrylamides. The N-alkyl(meth)acrylamide is particularly preferably N-methylolmethacrylamide, 2-hydroxypropylmethacrylamide or N-isopropylmethacrylamide, particularly preferably N-isopropylmethacrylamide.

The alkyl acrylates present are preferably alkyl acrylates having from 1 to 8 carbon atoms in the alkyl radical, particularly preferably ethyl acrylate, n-propyl acrylate or n-butyl acrylate. The acrylates as repeating units in the polymer first and foremost increase the thermal stability of the polymer. As an alternative or in addition, tert-butyl acrylate or isopropyl acrylate can, in particular, also be used as comonomers. These are copolymerizable blowing agents which under foaming conditions form an acrylic acid repeating unit in the polymer chain and at the same time liberate propene or isobutene. Such copolymerizable blowing agents can be present as sole blowing agents or can be combined with uncopolymerizable blowing agents of the composition.

As the further alkyl methacrylates which are optionally present in addition to MMA, preference is given, in particular, to ones having from 2 to 8 carbon atoms in the alkyl radical. Particular preference is given to ethyl methacrylate, n-propyl methacrylate, n-butyl methacrylate or 2-ethylhexyl methacrylate. As an alternative or in addition, tert-butyl methacrylate or isopropyl methacrylate can, in particular, also be used as comonomers. These two alternatives are also copolymerizable blowing agents which ultimately form methacrylic acid repeater units.

In a particularly preferred embodiment which tends to form small and very uniform pores, the alkyl methacrylates are entirely or partly tert-butyl methacrylate and/or isopropyl methacrylate, and/or the alkyl acrylates are entirely or partly tert-butyl acrylate and/or isopropyl acrylate. The monomer mixture particularly preferably contains from 5 to 10% by weight of tert-butyl methacrylate, isopropyl methacrylate, tert-butyl acrylate and/or isopropyl acrylate. Very good results in respect of the pore size and shape are achieved when the composition does not comprise any uncopolymerizable blowing agent.

The crosslinkers optionally present are preferably a di(meth)acrylate, tri(meth)acrylate or tetra(meth)acrylate, allyl (meth)acrylate, triallyl cyanurate, triallyl isocyanurate or a mixture containing at least two of these crosslinkers.

The hydroxy-functional alkyl (meth)acrylate which is likewise optionally present is preferably 2-hydroxyethyl (meth)acrylate or 3-hydroxypropyl (meth)acrylate. There are preferably no free hydroxy and acid groups simultaneously present in the monomer mixture.

The chain-transfer agents which are optionally present in the composition are preferably a compound having from one to five mercaptan groups, a γ-terpinene or a mixture of at least two of these chain-transfer agents. The chain-transfer agent is particularly preferably pentaerythritol tetrathioglycolate, 2-mercaptoethanol, an alkyl mercaptan having from 2 to 12 carbon atoms, thioglycolic acid, a thioglycolate, γ-terpinene or a mixture of at least two of these chain-transfer agents.

The PMMA foams obtained according to the invention have a surprisingly high strength and also a surprisingly low brittleness and therefore can, for example, find application in lightweight construction. Owing to the good materials properties, there is no need for the use of plasticizers, e.g. relatively long-chain alkyl (meth)acrylates or phthalates, which according to knowledge to date have a positive effect on the flowability or the foamability but at the same time have an adverse effect on the mechanical properties of the PMMA foam, in particular the strength.

Particularly suitable uncopolymerizable blowing agents are tert-butanol, n-heptane, MTBE, methyl ethyl ketone, another alcohol having from one to four carbon atoms, water, methylal, urea and/or tert-butyl methyl ether.

The polymerization is preferably carried out in a shape-conferring vessel, in particular in the form of a chamber polymerization between two plates, for example glass plates. In the simplest case, the vessel can be, for example, a rectangular tank. Polymerization in such a tank later gives a plate whose thickness has been determined by the fill level in the tank or the plate spacing. In addition, however, more complex shapes are also conceivable for the vessel. The polymerization is preferably carried out at a temperature in the range from 30 to 70° C. Here, generally known free-radical initiators, for example peroxides or azo initiators, in addition ro redox systems or UV initiators, can be used as initiators. Polymerization temperatures below 40° C. apply particularly to these redox systems and UV initiators. UV initiators are initiated by irradiation with appropriate UV light, while redox initiators comprise two-component systems initiated by mixing the two components and the monomers.

Foaming may subsequently take place in the same vessel, in which case the volume increase is restricted to one direction, the open side of the vessel. However, the polymerized material can also be foamed without enclosure or in a suspended manner. Foaming is preferably carried out in an oven. As an alternative, it is also possible to bring about foaming by irradiation with IR radiation, in particular radiation having a wavelength in the range from 0.78 to 2.20 μm, preferably from 1.20 to 1.40 μm. Microwave foaming represents a further alternative. The combination of various methods, such as IR radiation, microwaves and/or heating in an oven is also conceivable.

Foaming as well as the prior polymerization may each be carried out in a plurality of temperature stages as previously mentioned. The temperature may be raised later in the polymerizing step to additionally enhance the conversion and thereby reduce the residual monomer content. During foaming, the foaming temperature can be increased stepwise in order to influence the pore distribution, the pore size and number of pores.

The process can, as indicated above, also optionally be carried out by carrying out the polymerization only incompletely, in this case preferably to a conversion of at least 80%, and effecting the final full polymerization during foaming. Such a process has the advantage that the monomers which remain have a plasticizing effect at the beginning of the foaming operation without a plasticizing compound remaining in the finished foam. Therefore, in such an embodiment, the polymerization and the foaming would take place simultaneously to some extent—at one foaming temperature.

Apart from the process of the invention, the present invention also provides PMMA foams which can be produced, for example, by such a process. Such a PMMA foam is characterized in that the solid part of this foam consists to an extent of at least 95% by weight of a polymer produced from a monomer mixture consisting of from 70 to 95% by weight of MMA, from 0.1 to 5% by weight of alkyl acrylates having from 1 to 12 carbon atoms in the alkyl radical, from 0 to 10% by weight of alkyl methacrylates having from 2 to 12 carbon atoms in the alkyl radical, from 0.5 to 10% by weight of methacrylamides, N-alkylmethacrylamides and/or N,N-dialkylmethacrylamides, from 0 to 10% by weight of crosslinkers, from 0 to 10% by weight of acrylic, methacrylic and/or itaconic acid and from 0 to 10% by weight of a hydroxy-functional alkyl (meth)acrylate. The foam preferably has a density in the range from 50 to 350 kg/m$^3$, particularly preferably from 75 to 250 kg/m$^3$.

The PMMA foams according to the present invention and also the PMMA foams obtained according to the present invention are useful for many and varied purposes. Examples of such uses are weathering-resistant insulation materials, core material for sandwich composites, in lightweight construction, as packaging material, as energy absorbers in crash elements, in architectural building elements, as diffuser in lighting applications, in furniture construction, in boat construction, in vehicle construction, in the aerospace industry or in model building.

EXAMPLES

General Method for Producing a PMMA Foam

The individual components of the formulation (for specific compositions, see the following tables) were weighed out in succession and subsequently mixed for about 20 minutes by means of a stirring motor, optionally with the use of an Ultraturrax, so as to give a homogeneous mixture. The polymerization of the mixture was carried out in a chamber which consisted of two glass plates having a size of 300×400 mm and a peripheral seal. The chamber was subsequently heated in a waterbath and the contents were thus polymerized. A heat treatment was subsequently carried out. After polymerization and heat treatment had been concluded, foaming was carried out using the parameters specifically indicated in the tables.

Rewopol SB-DO 75 is a blowing agent which is added to aid separation of the polymerized PMMA from the glass plates used. This component has no influence on the production of the foam and is used here only for the specific examples to assist the process. Aerosil OX50 is added as nucleating agent. This gives a larger number of smaller pores. However, foams produced without use of a nucleating agent also have very good properties, so that the use of this component should also not be construed as restricting the invention. Pentaerythritol tetrathioglycolate is a chain-transfer agent, while 2,2'-azobis(2,4-dimethylvaleronitrile) is an initiator.

Example 1

TABLE 1

Composition and foaming conditions for Example 1

| Mixture | Weight used [g] | Composition [% by weight] |
|---|---|---|
| PMMA dissolved in MMA (20% by weight) | 1114.75 | 85.75 |
| tert-Butyl methacrylate | 91.00 | 7.0 |
| n-Butyl acrylate | 13 | 1 |
| Glycol dimethacrylate | 0.78 | 0.06 |
| N-Isopropylmethacrylamide | 26 | 2 |
| 2,2'-Azobis(2,4-dimethylvaleronitrile) | 0.65 | 0.05 |
| Pentaerythritol tetrathioglycolate | 0.52 | 0.04 |
| Rewopol SB-DO 75 | 1.3 | 0.1 |
| Aerosil OX50 | 52 | 4 |
| Total | 1300 | 100 |
| Plate thickness | 10 mm | |
| Glass format | 400 × 300 mm | |
| Polymerization | 24 hours at 42° C. | |
| Heat treatment | 4 hours at 115° C. | |
| Foaming | 1 hour at 215° C. in a convection oven | |
| Compressive strength | 2.7 MPa (density 125 kg/m$^3$) | |

Example 2

TABLE 2

Composition and foaming conditions for Example 2

| Mixture | Weight used [g] | Composition [% by weight] |
|---|---|---|
| PMMA dissolved in MMA (20% by weight) | 1075.75 | 82.75 |
| tert-Butyl methacrylate | 91.00 | 7.0 |
| n-Butyl acrylate | 13 | 1 |
| Glycol dimethacrylate | 0.78 | 0.06 |
| N-Isopropylmethacrylamide | 65 | 5 |
| 2,2'-Azobis(2,4-dimethylvaleronitrile) | 0.65 | 0.05 |
| Pentaerythritol tetrathioglycolate | 0.52 | 0.04 |
| Rewopol SB-DO 75 | 1.3 | 0.1 |
| Aerosil OX50 | 52 | 4 |
| Total | 1300 | 100 |
| Plate thickness | 10 mm | |
| Glass format | 400 × 300 mm | |
| Polymerization | 24 hours at 42° C. | |
| Heat treatment | 4 hours at 115° C. | |
| Foaming | 1 hour at 215° C. in a convection oven | |
| Compressive strength | 2.8 MPa (density 130 kg/m$^3$) | |

Example 3

TABLE 3

Composition and foaming conditions for Example 3

| Mixture | Weight used [g] | Composition [% by weight] |
|---|---|---|
| PMMA dissolved in MMA (20% by weight) | 1075.75 | 82.75 |
| tert-Butyl methacrylate | 91.00 | 7.0 |
| n-Butyl acrylate | 13 | 1 |
| Glycol dimethacrylate | 0.78 | 0.06 |
| N-Isopropylmethacrylamide | 65 | 5 |
| 2,2'-Azobis(2,4-dimethylvaleronitrile) | 0.65 | 0.05 |
| Pentaerythritol tetrathioglycolate | 1.04 | 0.08 |
| Rewopol SB-DO 75 | 1.3 | 0.1 |
| Aerosil OX50 | 52 | 4 |
| Total | 1300 | 100 |
| Plate thickness | 10 mm | |
| Glass format | 400 × 300 mm | |
| Polymerization | 24 hours at 42° C. | |
| Heat treatment | 4 hours at 115° C. | |
| Foaming | 35 min at 230° C. | |
| Compressive strength | 0.84 MPa (density 80 kg/m$^3$) | |

Example 4

TABLE 4

Composition and foaming conditions for Example 4

| Mixture | Weight used [g] | Composition [% by weight] |
|---|---|---|
| PMMA dissolved in MMA (20% by weight) | 1075.71 | 82.75 |
| tert-Butyl methacrylate | 91.00 | 7.0 |
| n-Butyl acrylate | 13 | 1 |
| Glycol dimethacrylate | 0.78 | 0.06 |
| N-Isopropylmethacrylamide | 65 | 5 |
| 2,2'-Azobis(2,4-dimethylvaleronitrile) | 0.65 | 0.05 |
| Pentaerythritol tetrathioglycolate | 1.56 | 0.12 |
| Rewopol SB-DO 75 | 1.3 | 0.1 |
| Aerosil OX50 | 52 | 4 |
| Total | 1300 | 100 |
| Plate thickness | 10 mm | |
| Glass format | 400 × 300 mm | |
| Polymerization | 24 hours at 42° C. | |
| Heat treatment | 4 hours at 115° C. | |
| Foaming | Hot air microwave oven (Sharp), 200° C., microwave setting 1 | |
| Compressive strength | 0.5 MPa (density 57 kg/m$^3$) | |

Example 5

TABLE 5

Composition and foaming conditions for Example 5

| Mixture | Weight used [g] | Composition [% by weight] |
|---|---|---|
| PMMA dissolved in MMA (20% by weight) | 1101.75 | 84.75 |
| tert-Butyl methacrylate | 65.00 | 5.00 |
| n-Butyl acrylate | 13 | 1.00 |
| Glycol dimethacrylate | 0.78 | 0.06 |
| N-Isopropylmethacrylamide | 65 | 5 |
| 2,2'-Azobis(2,4-dimethylvaleronitrile) | 0.65 | 0.05 |
| Pentaerythritol tetrathioglycolate | 0.52 | 0.04 |
| Rewopol SB-DO 75 | 1.3 | 0.1 |
| Aerosil OX50 | 52.00 | 4 |
| Total | 1300 | 100 |
| Plate thickness | 10 mm | |
| Glass format | 400 × 300 mm | |
| Polymerization | 24 hours at 40° C. | |
| Heat treatment | 4 hours at 115° C. | |

TABLE 5-continued

Composition and foaming conditions for Example 5

| Mixture | Weight used [g] | Composition [% by weight] |
|---|---|---|
| Foaming | 60 min at 215° C. | |
| Compressive strength | 9.3 MPa (density 300 kg/m$^3$) | |

Comparative Example 1

TABLE 6

Composition and foaming conditions for Comparative Example 1

| Mixture | Weight used [g] | Composition [% by weight] |
|---|---|---|
| PMMA dissolved in MMA (20% by weight) | 1406.25 | 93.75 |
| tert-Butyl methacrylate | 75.00 | 5.00 |
| n-Butyl acrylate | 15 | 1 |
| Glycol dimethacrylate | 0.90 | 0.06 |
| 2,2'-Azobis(2,4-dimethylvaleronitrile) | 0.75 | 0.05 |
| Pentaerythritol tetrathioglycolate | 0.60 | 0.04 |
| Rewopol SB-DO 75 | 1.50 | 0.10 |
| Total | 1500.00 | 100.00 |
| Plate thickness | 10 mm | |
| Glass format | 400 × 300 mm | |
| Polymerization | 24 hours at 42° C. | |
| Heat treatment | 4 hours at 115° C. | |
| Foaming | 1 h at 215° C. | |
| Compressive strength | 1.25 MPa (density 112 kg/m$^3$) | |

Comparative Example 2

TABLE 7

Composition and foaming conditions for Comparative Example 2

| Mixture | Weight used [g] | Composition [% by weight] |
|---|---|---|
| PMMA dissolved in MMA (20% by weight) | 1140.75 | 87.75 |
| tert-Butyl methyl ether | 91.00 | 7.00 |
| n-Butyl acrylate | 13.00 | 1.00 |
| Glycol dimethacrylate | 0.78 | 0.06 |
| 2,2'-Azobis(2,4-dimethylvaleronitrile) | 0.65 | 0.05 |
| Pentaerythritol tetrathioglycolate | 0.52 | 0.04 |
| Rewopol SB-DO 75 | 1.30 | 0.10 |
| Aerosil OX50 | 52.00 | 4.00 |
| Total | 1300.00 | 100.00 |
| Plate thickness | 10 mm | |
| Glass format | 400 × 300 mm | |
| Polymerization | 24 hours at 42° C. | |
| Heat treatment | 4 hours at 115° C. | |
| Foaming | 20 min at 215° C. | |
| Compressive strength | 0.7 MPa (density 90 kg/m$^3$) | |

Comparative Example 3

TABLE 8

Composition and foaming conditions for Comparative Example 3

| Mixture | Weight used [g] | Composition [% by weight] |
|---|---|---|
| PMMA dissolved in MMA (20% by weight) | 1140.75 | 87.75 |
| tert-Butyl methyl ether | 91.00 | 7.00 |
| n-Butyl acrylate | 13.00 | 1.00 |
| Glycol dimethacrylate | 0.78 | 0.06 |
| 2,2'-Azobis(2,4-dimethylvaleronitrile) | 0.65 | 0.05 |
| Pentaerythritol tetrathioglycolate | 0.52 | 0.04 |
| Rewopol SB-DO 75 | 1.30 | 0.10 |
| Aerosil OX50 | 52.00 | 4.00 |
| Total | 1300.00 | 100.00 |
| Plate thickness | 10 mm | |
| Glass format | 400 × 300 mm | |
| Polymerization | 24 hours at 42° C. | |
| Heat treatment | 4 hours at 115° C. | |
| Foaming | 30 min at 230° C. | |
| Compressive strength | 0.35 MPa (density 61 kg/m$^3$) | |

Comparative Example 4

TABLE 9

Composition and foaming conditions for Comparative Example 4

| Mixture | Weight used [g] | Composition [% by weight] |
|---|---|---|
| PMMA dissolved in MMA (20% by weight) | 1404.00 | 87.75 |
| tert-Butyl methacrylate | 80.00 | 5.00 |
| n-Butyl acrylate | 16.00 | 1.00 |
| Glycol dimethacrylate | 0.96 | 0.06 |
| 2,2'-Azobis(2,4-dimethylvaleronitrile) | 0.80 | 0.05 |
| Pentaerythritol tetrathioglycolate | 0.64 | 0.04 |
| Rewopol SB-DO 75 | 1.60 | 0.10 |
| Aerosil OX50 | 96.00 | 6.00 |
| Total | 1600.00 | 100.00 |
| Plate thickness | 10 mm | |
| Glass format | 400 × 300 mm | |
| Polymerization | 24 hours at 42° C. | |
| Heat treatment | 4 hours at 115° C. | |
| Foaming | Irradiation using IR radiators to the desired density | |
| Compressive strength | 1.38 MPa (density 140 kg/m$^3$) | |

Results

TABLE 10

Comparison of the mechanical properties

| | Density [kg/m$^3$] | Compressive strength [MPa] |
|---|---|---|
| Example 1 | 125 | 2.7 |
| Example 2 | 130 | 2.8 |
| Example 3 | 80 | 0.84 |
| Example 4 | 57 | 0.5 |
| Example 5 | 300 | 9.3 |
| Comparative Example 1 | 112 | 1.25 |
| Comparative Example 2 | 90 | 0.7 |

TABLE 10-continued

Comparison of the mechanical properties

|  | Density [kg/m³] | Compressive strength [MPa] |
|---|---|---|
| Comparative Example 3 | 61 | 0.35 |
| Comparative Example 4 | 140 | 1.38 |

The comparative examples were produced without addition of an (alkyl)methacrylamide to the monomer mixture. The results in Table 10 impressively show, taking into account the respective density, the surprising positive effect which this monomer component has on the compressive strength of the future foam.

The invention claimed is:

1. A process for producing a polymethacrylate foam, the process comprising:
   polymerizing at least a portion of a composition at a temperature in a range of from 20° C. to 100° C., thereby producing a polymerized composition; and
   foaming at least a portion of the polymerized composition at a temperature in a range of from 130° C. to 250° C.,
   wherein the composition comprises an initiator in a range of from 0.2 to 2.0 wt. %; an unpolymerizable blowing agent in a range of from 0 to 20 wt. %; a chain-transfer agent in a range of from 0 to 5 wt. %; and a monomer mixture in a range of from 70 to 99.8% by weight,
   wherein the monomer mixture consists of, optionally in at least partially polymerized form,
   MMA in a range of from 70 to 95 wt. %,
   alkyl acrylate(s) having 1 to 12 carbon atoms the alkyl radical in a range of from 0.1 to 5 wt. %,
   alkyl methacrylate(s) having from 2 to 12 carbon atoms in the alkyl radical in a range from 0 to 10 wt. %,
   a methacrylamide, an N-alkylmethacrylamide an N,N-dialkylmethacrylamide, or a mixture of two or more of any of these, in a range of from 0.5 to 10 wt. %,
   crosslinker(s) in a range of from 0 to 10 wt. %,
   acrylic acid, methacrylic acid, and/or itaconic acid in a range of from 0 to 10 wt. %, and
   hydroxy functional alkyl (meth)acrylate(s) in a range of from 0 to 10 wt. %.

2. The process of claim 1, wherein the polymerization is carried out at a temperature in a range of from 30° C. to 70° C., and
   the foaming is carried out at a temperature in a range of from 150° C. to 230° C.

3. The process of claim 1, wherein the crosslinker is at least one selected from the group consisting of a di(meth)acrylate, tri(meth)acrylate or tetra(meth)acrylate, allyl (meth)acrylate, triallyl cyanurate, and triallyl isocyanurate.

4. The process of claim 1, wherein the alkyl methacrylate comprises tert-butyl methacrylate and/or isopropyl methacrylate.

5. The process of claim 4, wherein the monomer mixture contains from 5 to 10 wt. % of tert-butyl methacrylate, isopropyl methacrylate, tert-butyl acrylate, and/or isopropyl acrylate,
   wherein when the monomer mixture contains tert-butyl acrylate, it is present in a mixture with at least one of tert-butyl methacrylate, isopropyl methacrylate, and/or isopropyl acrylate and the tert-butyl acrylate is present in an amount of no more than 5 wt. %, and
   when the monomer mixture contains isopropyl acrylate, it is present in a mixture with at least one of tert-butyl methacrylate, isopropyl methacrylate, and/or tert-butyl acrylate, and the isopropyl acrylate is present in an amount of no more than 5 wt. %, and
   the composition does not comprise any uncopolymerizable blowing agent.

6. The process of claim 1, wherein the composition comprises from 0.5 to 1.5 wt. % of the initiator, from 0 to 15 wt. % of the unpolymerizable blowing agent, from 0 to 1 wt. % of the chain-transfer agent, and from 75 to 98.49 wt. % of the monomer mixture,
   wherein the monomer mixture is present in a range of from 0 to 50 wt. % in at least partially polymerized form, and
   wherein the monomer mixture contains
   the MMA in a range of from 75 to 95 wt. %,
   the alkyl acrylate comprising alkyl acrylate comprising 1 to 12 carbon atoms in the alkyl radical, as an alkyl acrylate comprising from 1 to 8 carbon atoms in the alkyl radical, in a range of from 0.5 to 2.5 wt. %,
   the alkyl methacrylate comprising from 2 to 12 carbon atoms in the alkyl radical, as an alkyl methacrylate comprising from 2 to 8 carbon atoms in the alkyl radical, in a range of from 0 to 5 wt. %,
   the methacrylamide, N-alkylmethacrylamide, and/or N,N-dialkylmethacrylamide in a range of from 1 to 8 wt. %,
   dimethacrylate or trimethacrylate in a range of from 0 to 5 wt. %, and
   the acrylic acid, methacrylic acid, and/or itaconic acid as the crosslinker(s) in a range of from 0 to 8 wt. %.

7. The process of claim 1, wherein the monomer mixture contains the N-alkylmethacrylamide,
   wherein the N-alkylacrylamide has from 1 to 12 carbon atoms in the alkyl group, and
   wherein no methacrylamide or N,N-dialkylmethacrylamide are present.

8. The process of claim 1, wherein the methacrylamide is N-methylolmethacrylamide, 2 hydroxypropylmethacrylamide or N-isopropylmethacrylamide.

9. The process of claim 1, wherein the polymerizing polymerizes the entire composition before the foaming step occurs.

10. The process of claim 1, wherein the polymerizing polymerizes only a portion of the composition, and the foaming step comprises additional polymerization of the composition.

11. A PMMA foam, having a density in a range of from 50 to 350 kg/m³,
   wherein a solid part of the PMMA foam comprises at least 95% by weight of a polymer produced from a monomer mixture consisting of
   MMA in a range of from 70 to 95 wt. %,
   at least one alkyl acrylate comprising 1 to 12 carbon atoms in the alkyl radical in a range of from 0.1 to 5 wt. %,
   at least one alkyl methacrylate comprising 2 to 12 carbon atoms in the alkyl radical in a range of from 0 to 10 wt. %,
   an methacrylamide, an N-alkylmethacrylamide, and/or an N,N-dialkylmethacrylamide in a range of from 0.5 to 10 wt. %,
   a crosslinker in a range of from 0 to 10 wt. %,
   acrylic acid, methacrylic acid, and/or itaconic acid in a range of from 0 to 10 wt. %, and
   a hydroxy-functional alkyl (meth)acrylate in a range of from 0 to 10 wt. %.

12. The foam of claim 11, having a density in a range of from 75 to 250 kg/m³.

13. The process of claim 1, wherein the monomer mixture is present to an extent of up to 80 wt. % in at least partially polymerized form at the beginning of the polymerizing.

14. The process of claim 1, wherein the monomer mixture is present to an extent of up to 70 wt. % in at least partially polymerized form at the beginning of the polymerizing.

15. The process of claim 1, wherein the monomer mixture is present to an extent of up to 50 wt. % in at least partially polymerized form at the beginning of the polymerizing.

16. The process of claim 1, wherein the alkyl acrylate(s) are a mixture of alkyl acrylates that includes tert-butyl acrylate and/or isopropyl acrylate.

17. The process of claim 1, wherein the alkyl acrylate(s) is entirely tert-butyl acrylate and/or isopropyl acrylate.

18. The process of claim 1, wherein the alkyl acrylate(s) is entirely tert-butyl acrylate.

19. The process of claim 1, wherein the alkyl acrylate(s) is entirely isopropyl acrylate.

20. The process of claim 1, wherein the unpolymerizable blowing agent comprises tert-butanol, n-heptane, MTBE, methyl ethyl ketone, a C1-C4 alcohol, water, urea, methylal, or a mixture thereof.

* * * * *